(12) United States Patent
Natori et al.

(10) Patent No.: US 12,119,706 B2
(45) Date of Patent: Oct. 15, 2024

(54) NON-ORIENTED ELECTRICAL STEEL SHEET, PRODUCTION METHOD FOR NON-ORIENTED ELECTRICAL STEEL SHEET, ELECTRIC MOTOR AND PRODUCTION METHOD FOR ELECTRIC MOTOR

(71) Applicant: NIPPON STEEL CORPORATION, Tokyo (JP)

(72) Inventors: Yoshiaki Natori, Tokyo (JP); Hiroyoshi Yashiki, Tokyo (JP); Minako Fukuchi, Tokyo (JP); Kazutoshi Takeda, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 18/281,171

(22) PCT Filed: Mar. 30, 2022

(86) PCT No.: PCT/JP2022/015920
§ 371 (c)(1),
(2) Date: Sep. 8, 2023

(87) PCT Pub. No.: WO2022/210864
PCT Pub. Date: Oct. 6, 2022

(65) Prior Publication Data
US 2024/0039347 A1     Feb. 1, 2024

(30) Foreign Application Priority Data
Mar. 31, 2021     (JP) ................. 2021-061782

(51) Int. Cl.
| | | |
|---|---|---|
| C21D 9/46 | (2006.01) |
| B21B 1/22 | (2006.01) |
| C21D 6/00 | (2006.01) |
| C21D 8/12 | (2006.01) |
| C22C 38/00 | (2006.01) |
| C22C 38/02 | (2006.01) |
| C22C 38/04 | (2006.01) |
| C22C 38/06 | (2006.01) |
| C22C 38/12 | (2006.01) |
| C22C 38/14 | (2006.01) |
| C22C 38/20 | (2006.01) |
| C22C 38/22 | (2006.01) |
| C22C 38/24 | (2006.01) |
| C22C 38/26 | (2006.01) |
| C22C 38/28 | (2006.01) |
| C22C 38/30 | (2006.01) |
| C22C 38/32 | (2006.01) |
| C22C 38/34 | (2006.01) |

(Continued)

(52) U.S. Cl.
CPC ............... *H02K 1/02* (2013.01); *B21B 1/22* (2013.01); *C21D 6/008* (2013.01); *C21D 8/1222* (2013.01); *C21D 8/1233* (2013.01); *C21D 8/1244* (2013.01); *C21D 8/1261* (2013.01); *C21D 8/1272* (2013.01); *C21D 9/46* (2013.01); *C22C 38/002* (2013.01); *C22C 38/004* (2013.01); *C22C 38/005* (2013.01); *C22C 38/008* (2013.01); *C22C 38/02* (2013.01); *C22C 38/04* (2013.01); *C22C 38/06* (2013.01); *C22C 38/12* (2013.01); *C22C 38/14* (2013.01); *C22C 38/20* (2013.01); *C22C 38/22* (2013.01); *C22C 38/24* (2013.01); *C22C 38/26* (2013.01); *C22C 38/28* (2013.01); *C22C 38/30* (2013.01); *C22C 38/32* (2013.01); *C22C 38/34* (2013.01); *C22C 38/38* (2013.01); *C22C 38/42* (2013.01); *C22C 38/44* (2013.01); *C22C 38/46* (2013.01); *C22C 38/48* (2013.01); *C22C 38/50* (2013.01); *C22C 38/60* (2013.01); *H01F 1/147* (2013.01); *H02K 15/02* (2013.01); *H02K 15/12* (2013.01); *B21B 2001/221* (2013.01); *B21B 2001/225* (2013.01); *C21D 1/76* (2013.01); *C22C 38/58* (2013.01)

(58) Field of Classification Search
CPC ........................................................ C21D 9/46
See application file for complete search history.

(56) References Cited

U.S. PATENT DOCUMENTS

| | | |
|---|---|---|
| 2014/0373340 A1 | 12/2014 | Dorninger et al. |
| 2016/0203896 A1 | 7/2016 | Nakanishi et al. |
| 2020/0040423 A1 | 2/2020 | Natori et al. |

FOREIGN PATENT DOCUMENTS

| | | |
|---|---|---|
| JP | 64-225 A | 1/1989 |
| JP | 64-228 A | 1/1989 |

(Continued)

*Primary Examiner* — Jophy S. Koshy
(74) *Attorney, Agent, or Firm* — Birch, Stewart, Kolasch & Birch, LLP

(57) ABSTRACT

This non-oriented electrical steel sheet contains a base material having a chemical composition including, in mass %, Si: 3.2 to 4.5%, wherein the tensile strength is 550 MPa or more, and a ratio $(P_{120B}/Fe_{700B})_B$ between a peak-to-peak height $Fe_{700B}$ of Fe at 700 eV and a peak-to-peak height $P_{120B}$ of P at 120 eV when crystal grain boundaries are measured through Auger electron spectroscopy is not more than twice a ratio $(P_{120i}/Fe_{700i})_i$ between a peak-to-peak height $Fe_{700i}$ of Fe at 700 eV and a peak-to-peak height $P_{120i}$ of P at 120 eV when the inside of crystals is measured through Auger electron spectroscopy.

10 Claims, No Drawings

(51) Int. Cl.
*C22C 38/38* (2006.01)
*C22C 38/42* (2006.01)
*C22C 38/44* (2006.01)
*C22C 38/46* (2006.01)
*C22C 38/48* (2006.01)
*C22C 38/50* (2006.01)
*C22C 38/60* (2006.01)
*H01F 1/147* (2006.01)
*H02K 1/02* (2006.01)
*H02K 15/02* (2006.01)
*H02K 15/12* (2006.01)
*C21D 1/76* (2006.01)
*C22C 38/58* (2006.01)

(56) References Cited

FOREIGN PATENT DOCUMENTS

| | | |
|---|---|---|
| JP | 2009-68055 A | 4/2009 |
| JP | 2015-40309 A | 3/2015 |
| JP | 2016-151063 A | 8/2016 |
| JP | 2016-211016 A | 12/2016 |
| JP | 2017-106059 A | 6/2017 |
| JP | 2019-183231 A | 10/2019 |
| KR | 10-2019-0127964 A | 11/2019 |

NON-ORIENTED ELECTRICAL STEEL SHEET, PRODUCTION METHOD FOR NON-ORIENTED ELECTRICAL STEEL SHEET, ELECTRIC MOTOR AND PRODUCTION METHOD FOR ELECTRIC MOTOR

TECHNICAL FIELD

The present invention relates to a non-oriented electrical steel sheet, a production method for a non-oriented electrical steel sheet, an electric motor and a production method for an electric motor.

Priority is claimed on Japanese Patent Application No. 2021-061782, filed Mar. 31, 2021, the content of which is incorporated herein by reference.

BACKGROUND ART

In recent years, in the fields of automobiles and home appliances, products that consume less energy have been increasing in popularity due to the growing interest in addressing global environmental problems. These products use highly efficient electric motors that rotate at a high speed, and non-oriented electrical steel sheets are used as materials for cores (motor cores) of electric motors.

The core of the electric motor is constructed by cutting out an annular member (sheet piece) from a non-oriented electrical steel sheet and laminating and integrating a plurality of sheet pieces after cutting. The core is composed of a stator core and a rotor core. In recent years, in order to reduce the size and improve performance of machines, it has become important to reduce the iron loss of the stator core and increase the strength of the rotor core so that it can withstand high-speed rotation.

When a sheet piece for a core is cut out from a non-oriented electrical steel sheet, a punching method using a punch and a die is mainly applied. It is known that the working strain introduced into the sheet piece during punching deteriorates the iron loss of the core. In order to release the working strain, a heat treatment (strain relief annealing or core annealing) is performed on each sheet piece or a core in which sheet pieces are laminated. When strain relief annealing is performed, the working strain of the steel sheet is released or the crystal grains are further coarsened, and thus the iron loss of the motor core is also reduced. Strain relief annealing may be applied to the entire core, but it may be applied only to the stator core, and thus a high-strength rotor and a low-iron-loss stator can be separately produced from the same non-oriented electrical steel sheet.

Patent Document 1 discloses a stator core for a motor in which a decrease in iron loss is minimized and which has exceptional corrosion resistance, and is made of a non-oriented electrical steel sheet, wherein the non-oriented electrical steel sheet contains C: to 0.005%, Si: 1.5 to 5.0%, Mn: 0.1 to 3.0%, Al: 0 to 0.005%, P: 0.03 to 0.15%, S: 0 to N: 0 to 0.005%, and Sn: 0 to 0.01%, with the remainder being made up of Fe and impurities, and a ratio P120/Fe700 between a peak height Fe700 of Fe at 700 eV and a peak height P120 of P at 120 eV when crystal grain boundaries are measured through Auger electron spectroscopy is less than 0.020.

CITATION LIST

Patent Document

[Patent Document 1]
Japanese Unexamined Patent Application, First Publication No. 2019-183231

SUMMARY OF THE INVENTION

Problems to be Solved by the Invention

When the strength of the non-oriented electrical steel sheet increases, it is possible to rotate a rotary machine at a high speed. However, when the rotary machine suddenly stops, an impact force applied to the core increases as the speed increases. If brittle fracture occurs due to the impact force at this time, the core is damaged. In the present embodiment, as a method for evaluating impact resistance, a Charpy test using a laminated block, which will be described below, is devised and the impact resistance is evaluated. As a result, it is found that the impact resistance tends to decrease as the strength of the non-oriented electrical steel sheet increases. In order to further improve safety of the rotary machine, it is necessary to achieve both high strength and impact resistance.

The present invention has been made in view of the above circumstances, and an object of the present invention is to provide a non-oriented electrical steel sheet having high strength and exceptional impact resistance, a production method for a non-oriented electrical steel sheet, an electric motor, and a production method for an electric motor.

Means for Solving the Problem

The inventors conducted extensive studies regarding the relationship between an increase in strength and a decrease in impact resistance of a non-oriented electrical steel sheet using an impact test on a laminated block to be described below. As a result, it was found that, in products designed to have increased strength (for example, motor cores using non-oriented electrical steel sheets), the P concentration at crystal grain boundaries is high in many cases, and there is a correlation between the P concentration at crystal grain boundaries and a decrease in impact resistance. Impact resistance is considered to decrease when the strength of the non-oriented electrical steel sheet increases for the following reason.

In order to increase the strength of the non-oriented electrical steel sheet, it is necessary to increase the content of Si, which has a strong solid-solution strengthening ability. If the content of Si increases, Si and P have a repulsive interaction, and as a result, the segregation of P at grain boundaries is promoted.

In addition, when Mn and Cr are contained, since Mn and Cr have an attractive interaction with C, segregation of C at grain boundaries is minimized. Then, the C concentration at crystal grain boundaries decreases, and as a result, the segregation of P at grain boundaries is thus promoted.

Crystal grain boundary embrittlement and a decrease in impact resistance due to P segregation become noticeable particularly when the tensile strength of the non-oriented electrical steel sheet is more than 550 MPa.

The inventors conducted extensive studies regarding a method for reducing segregation of P at grain boundaries in a non-oriented electrical steel sheet having a tensile strength of 550 MPa or more. Then, they found that, when chemical components of a non-oriented electrical steel sheet and a production method are appropriately controlled, it is possible to reduce segregation of P at grain boundaries. The present invention has been further studied, and the gist of the present invention is as follows.

(1) A non-oriented electrical steel sheet according to a first embodiment of the present invention includes a base material having a chemical composition including, in mass %,
C: 0.0010 to 0.0040%,
Si: 3.2 to 4.5%,
sol. Al: 0.2 to 2.0%,
Mn: 0.1 to 3.5%,
P: more than 0% and 0.10% or less,
S: 0 to 0.0030%,
N: 0 to 0.0030%,
Ti: 0 to 0.0030%,
Mo: 0.0010 to 0.1000%,
Cr: 0 to 0.10%,
B: 0 to 0.0010%,
Ni: 0 to 0.50%,
Cu: 0 to 0.50%,
Sn: 0 to 0.2000%,
Sb: 0 to 0.2000%,
Ca: 0 to 0.0050%,
Zn: 0 to 0.0050%,
La: 0 to 0.0050%,
Ce: 0 to 0.0050%,
O: 0 to 0.1000%,
V: 0 to 0.1000%,
W: 0 to 0.1000%,
Zr: 0 to 0.1000%,
Nb: 0 to 0.1000%,
Mg: 0 to 0.1000%,
Bi: 0 to 0.1000%,
Nd: 0 to 0.1000%,
Y: 0 to 0.1000%,
As: 0 to 0.1000%,
Ga: 0 to 0.1000%,
Ge: 0 to 0.1000%,
Co: 0 to 0.1000%,
Se: 0 to 0.1000%,
Pb; 0 t□ 0.1000%, and
the remainder: Fe and impurities,
wherein the tensile strength is 550 MPa or more, and a ratio $(P_{120B}/Fe_{700B})_B$ between a peak-to-peak height $Fe_{700B}$ of Fe at 700 eV and a peak-to-peak height $P_{120B}$ of P at 120 eV when crystal grain boundaries are measured through Auger electron spectroscopy is not more than twice a ratio $(P_{120i}/Fe_{700i})_i$ between a peak-to-peak height $Fe_{700i}$ of Fe at 700 eV and a peak-to-peak height $P_{120i}$ of P at 120 eV when the inside of crystals is measured through Auger electron spectroscopy.

(2) The non-oriented electrical steel sheet according to (1), which may contain one or more selected from the group consisting of
Ni: 0.01 to 0.50%,
Cu: 0.01 to 0.50%,
Sn: 0.01 to 0.2000%,
Sb: 0.01 to 0.2000%,
Ca: 0.0005 to 0.0050%,
Zn: 0.0003 to 0.0050%,
La: 0.0005 to 0.0050%,
Ce: 0.0005 to 0.0050%,
O: 0.0020 to 0.1000%,
V: 0.0010 to 0.0100%,
W: 0.0010 to 0.0100%,
Zr: 0.0010 to 0.0100%,
Nb: 0.0010 to 0.0100%,
Mg: 0.0010 to 0.0100%,
Bi: 0.0010 to 0.0100%,
Nd: 0.0010 to 0.0100%,
Y: 0.0010 to 0.0100%,
As: 0.0010 to 0.0100%,
Ga: 0.0010 to 0.0100%,
Ge: 0.0010 to 0.0100%,
Co: 0.0010 to 0.0100%,
Se: 0.0010 to 0.0100%,
Pb; 0.0010 t□ 0.0100%, (3) The non-oriented electrical steel sheet according to (1) or (2), wherein the base material may have an insulation coating on its surface.

(4) A production method for a non-oriented electrical steel sheet according to a second embodiment of the present invention is a method for producing the non-oriented electrical steel sheet according to (1) or (2), including a hot rolling process in which a steel slab having the chemical components according to (1) or (2) is hot-rolled to obtain a hot-rolled steel sheet, a winding process in which the hot-rolled steel sheet is wound and cooled, a cold rolling process in which the cooled hot-rolled steel sheet is cold-rolled to obtain a cold-rolled steel sheet, and a final annealing process in which the cold-rolled steel sheet is finally annealed, wherein, in cooling in the winding process of the hot-rolled steel sheet, a residence time in a temperature range of 500 to 200° C. is longer than a residence time in a temperature range of 700 to 500° C. and the residence time in a temperature range of 500 to 200° C. is 100 seconds or longer, and wherein, in the final annealing process, the maximum temperature is lower than 900° C., and the average cooling rate in a range of 700 to 500° C. in the cooling procedure is 20° C./sec or faster.

(5) A production method for a non-oriented electrical steel sheet according to a third embodiment of the present invention is a method for producing the non-oriented electrical steel sheet according to (1) or (2), and is a method for producing the non-oriented electrical steel sheet according to (1) or (2), including a process in which a steel slab having the chemical components according to (1) or (2) is hot-rolled to obtain a hot-rolled steel sheet, a winding process in which the hot-rolled steel sheet is wound and cooled, a hot-band annealing process in which the cooled hot-rolled steel sheet is heated and cooled, a cold rolling process in which the hot-rolled steel sheet after the hot-band annealing process is cold-rolled to obtain a cold-rolled steel sheet, and a final annealing process in which the cold-rolled steel sheet is finally annealed, wherein, in cooling of the hot-band annealing process of the hot-rolled steel sheet, a residence time in a temperature range of 500 to 200° C. is longer than a residence time in a temperature range of 700 to 500° C. and the residence time in a temperature range of 500 to 200° C. is 10 seconds or longer, and in the final annealing process, the maximum temperature is lower than 900° C., and the average cooling rate in a range of 700 to 500° C. in the cooling procedure is 20° C./sec or faster.

(6) An electric motor according to a fourth embodiment of the present invention is an electric motor including a stator core,
wherein the stator core has a chemical composition including, in mass %,
C: 0.0010 to 0.0040%,
Si: 3.2 to 4.5%,
sol. Al: 0.2 to 2.0%,
Mn: 0.1 to 3.5%, P: more than 0% and 0.10% or less,
S: 0 to 0.0030%,
N: 0 to 0.0030%,
Ti: 0 to 0.0030%,
Mo: 0.0010 to 0.1000%,
Cr: 0 to 0.10%,
B: 0 to 0.0010%,
Ni: 0 to 0.50%,
Cu: 0 to 0.50%,
Sn: 0 to 0.2000%,
Sb: 0 to 0.2000%,
Ca: 0 to 0.0050%,
Zn: 0 to 0.0050%,
La: 0 to 0.0050%,
Ce: 0 to 0.0050%,
O: 0 to 0.1000%,
V: 0 to 0.1000%,
W: 0 to 0.1000%,
Zr: 0 to 0.1000%,
Nb: 0 to 0.1000%,
Mg: 0 to 0.1000%,
Bi: 0 to 0.1000%,
Nd: 0 to 0.1000%,
Y: 0 to 0.1000%,
As: 0 to 0.1000%,
Ga: 0 to 0.1000%,
Ge: 0 to 0.1000%,
Co: 0 to 0.1000%,
Se: 0 to 0.1000%,
Pb; 0 t☐ 0.1000%, and
the remainder: Fe and impurities,
wherein the tensile strength is 500 MPa or more, and a ratio $(P_{120SB}/Fe_{700SB})_{SB}$ between a peak-to-peak height $Fe_{700SB}$ of Fe at 700 eV and a peak-to-peak height $P_{120SB}$ of P at 120 eV when crystal grain boundaries of the stator core are measured through Auger electron spectroscopy is not more than 4 times a ratio $(P_{120Si}/Fe_{700Si})_{Si}$ between a peak-to-peak height $Fe_{700Si}$ of Fe at 700 eV and a peak-to-peak height $P_{120Si}$ of P at 120 eV when the inside of crystals is measured through Auger electron spectroscopy.

(7) A production method for an electric motor according to a fifth embodiment of the present invention is a production method for an electric motor including a stator core, including a process in which the non-oriented electrical steel sheet according to (1) or (2) is processed into a stator core shape to form a stator core material and an annealing process in which the stator core material is heated to obtain a stator core, wherein, in the annealing process of the stator core material, the heating temperature is 750 to 850° C., and the average cooling rate in a range of 700 to 500° C. in the cooling procedure is 5° C./min or shorter.

Effects of the Invention

According to the above embodiment of the present invention, it is possible to provide a non-oriented electrical steel sheet having high strength and exceptional impact resistance, a production method for a non-oriented electrical steel sheet, an electric motor and a production method for an electric motor.

EMBODIMENT(S) FOR IMPLEMENTING THE INVENTION

Hereinafter, one embodiment of the present invention will be described in detail. However, the present invention is not limited to only the configuration disclosed in the present embodiment and can be variously modified without departing from the spirit and scope of the present invention. In addition, lower limit values and upper limit values are included in the numerical value limiting ranges stated below. Numerical values indicated by "more than" or "less than" are not included in these numerical value ranges. "%" indicating the content of respective elements means "mass %."

Since a non-oriented electrical steel sheet according to the present embodiment (hereinafter also referred to as a "steel sheet") has high strength and exceptional impact resistance, it is suitable for both stators and rotors. Particularly, it is suitable for stators. In addition, the non-oriented electrical steel sheet according to the present embodiment preferably has an insulation coating on the surface of a base material (silicon steel sheet) to be described below.

[Chemical Composition of Base Material]

The chemical component of the base material (silicon steel sheet) of the non-oriented electrical steel sheet of the present embodiment will be described. In the following, "%" of the chemical component means "mass %." A limited numerical value range indicated by "to" includes the lower limit value and the upper limit value.

C: 0.0010 to 0.0040%

C (carbon) is an element that causes iron loss deterioration of a non-oriented electrical steel sheet. If the C content is more than 0.0040%, the iron loss of the non-oriented electrical steel sheet deteriorates, and favorable magnetic characteristics cannot be obtained. Therefore, the C content is set to 0.0040% or less. The C content is preferably 0.0035% or less, more preferably 0.0030% or less, and still more preferably or less. The C content may be 0%, but since it is difficult to make the C content 0% in a practical steel sheet in terms of purification technology, the C content may be more than 0%. Here, C is an element that increases the hardness of the steel sheet. In consideration of this effect and preventing an increase in the iron loss as described above, the content is set to 0.0010 to 0.0040%. The lower limit of the C content is preferably 0.0015% or more and more preferably 0.0020% or more.

Si: 3.2 to 4.5%

Si (silicon) is an element that increases the strength of a steel sheet. In addition, Si is an element that increases resistivity and is contained in order to reduce the iron loss. In order to obtain these effects, the Si content is set to 3.2% or more. The Si content is preferably more than 3.25% and more preferably 3.3% or more. On the other hand, if the Si content is excessive, deterioration of processability due to steel embrittlement and a decrease in the saturation magnetic flux density may be caused. In this regard, the Si content is set to 3.2 to 4.5%. The upper limit is preferably 4.0% or less and more preferably 3.5% or less.

Sol. Al: 0.2 to 2.0%

Like Si, sol. Al (aluminum) is an element that increases resistivity and is contained in order to reduce the iron loss. In addition, sol. Al is an element that increases the strength of a steel sheet. In order to obtain these effects, the sol. Al content is set to 0.2% or more. The sol. Al content is preferably 0.3% or more and more preferably 0.5% or more. On the other hand, if the sol. Al content is excessive, a decrease in the saturation magnetic flux density may be caused. In this regard, the sol. Al content is 0.2 to 2.0%. The upper limit is preferably 1.5% or less and more preferably 1.2% or less.

Here, in the present embodiment, sol. Al is an acid-soluble Al, and indicates solid solution Al present in steel in a solid-solution state.

Mn: 0.1 to 3.5%

Like Si and sol. Al, since Mn (manganese) has a function of increasing resistivity, it is contained in order to reduce the iron loss. In addition, Mn is an element that increases the strength of a steel sheet. Therefore, the Mn content is set to 0.1% or more. The Mn content is preferably 0.2% or more, more preferably 0.3% or more, and still more preferably 0.5% or more. On the other hand, if the Mn content is excessive, a decrease in the magnetic flux density and embrittlement of the non-oriented electrical steel sheet become significant. In addition, Mn has an attractive interaction with C. Therefore, if the Mn content is excessive, the segregation of C at grain boundaries is minimized, the C concentration at crystal grain boundaries decreases, and as a result, the segregation of P at grain boundaries is promoted. In this regard, the content is set to 0.1 to 3.5%. The upper limit is preferably 2.5% or less and more preferably 1.5% or less.

P: more than 0%, 0.10%

P (phosphorus) is contained as impurities. P has a function of increasing the strength without lowering the magnetic flux density of the steel. However, if the P content is excessive, since the toughness of the steel is impaired and the steel sheet is likely to break, the P content is set to 0.10% or less. The P content is preferably 0.07% or less, more preferably 0.05% or less, and still more preferably 0.03% or less. P is not an essential element, and the lower limit of the P content is 0%. However, in consideration of production cost, the P content is preferably more than 0% and more preferably 0.01% or more. The lower limit of the P content may be 0.02% or more.

S: 0 to 0.0030%

S (sulfur) is contained as impurities. It is necessary to reduce the S content in order to reduce the iron loss. In addition, S itself undergoes grain boundary segregation and competes with segregation of C at grain boundaries, and as a result, promotes segregation of P at grain boundaries. Therefore, the S content is set to 0.0030% or less. The upper limit of the S content is preferably 0.0020% or less and more preferably 0.0010% or less. S is not an essential element, and the lower limit of the S content is 0%. However, in consideration of production cost, the lower limit of the S content may be 0.0001% or more. The lower limit of the S content is preferably 0.0003% or more.

N: 0 to 0.0030%

N (nitrogen) is contained as impurities. N combines with Al to form fine nitrides such as AlN. Such nitrides inhibit crystal grain growth during annealing and deteriorate magnetic characteristics. Therefore, the N content is set to 0.0030% or less. The upper limit of the N content is preferably 0.0020% or less and more preferably or less. N is not an essential element, and the lower limit of the N content is 0%. However, in consideration of production cost, the lower limit of the N content may be 0.0001% or more. The lower limit of the N content is preferably 0.0003% or more.

Ti: 0 to 0.0030%

Ti (titanium) is an element that is contained as an impurity. Ti combines with C, N, O, and the like in the base iron to form fine precipitates such as TiN, TiC, and Ti oxides. Such fine precipitates inhibit crystal grain growth during annealing and deteriorate magnetic characteristics. Therefore, the Ti content is set to 0.0030% or less. The upper limit of the Ti content is preferably 0.0020% or less and more preferably 0.0010% or less. Since it is not necessary to contain Ti, the lower limit of the content is 0%. However, in consideration of refining cost, the lower limit of the Ti content is preferably 0.0003% or more and more preferably 0.0005% or more.

Mo: 0.0010 to 0.1000%

Mo (molybdenum) is an element that minimizes diffusion of P and minimizes segregation of P at grain boundaries. Therefore, in the present embodiment, it is preferable to actively contain Mo. However, even if the Mo content is excessively large, the effect of minimizing segregation of P at grain boundaries is maximized. Therefore, in consideration of the above effect and maximizing the effect even if the Mo content is too large, the content is set to 0.0010 to 0.1000%. The lower limit of the Mo content is preferably 0.0100% or more and more preferably 0.0200% or more. The upper limit of the Mo content is preferably 0.0900% or less and more preferably 0.0800% or less.

Cr: 0 to 0.10%

Cr (chromium) is an element that improves corrosion resistance and high frequency characteristics. It is not necessary to contain Cr and the lower limit of the content is 0%. Although the Cr inclusion effect is obtained even if the amount is very small, in order to reliably obtain the inclusion effect, the Cr content is preferably 0.01% or more and more preferably 0.03% or more. On the other hand, if the Cr content is too large, segregation of C at grain boundaries is minimized, segregation of P at grain boundaries is promoted, and thus the impact resistance of the steel sheet decreases. Therefore, the upper limit of the Cr content is 0.10% or less. The upper limit of the C content is preferably 0.08% or less and more preferably 0.06% or less.

B: 0 to 0.0010%

B (boron) has an effect of improving grain growth by forming coarse BN and preventing formation of fine nitrides and may be contained as necessary. It is not necessary to contain B, and the lower limit of the B content is 0%. In order to obtain the above effect, the B content is preferably 0.0002% or more and more preferably 0.0003% or more. On the other hand, B itself undergoes grain boundary segregation and competes with segregation of C at grain boundaries, and as a result, promotes segregation of P at grain boundaries. Therefore, it is necessary to limit the B content, and the B content is set to 0 to 0.0010%. The upper limit of the B content is preferably 0.0008% or less and more preferably 0.0005% or less.

The remainder of the chemical composition of the base material (silicon steel sheet) of the non-oriented electrical steel sheet according to the present embodiment is made up of Fe and impurities. Impurities refer to components that are included in raw materials (ores, scraps and the like) when steel is industrially produced or components that are mixed in during a production procedure, and components that are not intentionally included in the steel sheet or components that are allowable within a range that does not adversely affect properties of the non-oriented electrical steel sheet according to the present embodiment.

Here, in addition to the above elements, one or more elements among Ni, Cu, Sn, Sb, Ca, Zn, La, Ce, O, V, W, Zr, Nb, Mg, Bi, Nd, and Y may be contained in place of some Fe.

Ni: 0 to 0.50%

Ni (nickel) is an element that increases the electrical resistance of a steel sheet and reduces the iron loss. It is not necessary to contain Ni and the lower limit of the content is 0%. Although the Ni inclusion effect is obtained even if the amount is very small, in order to reliably obtain the inclusion effect, the content is preferably 0.01% or more and more preferably 0.02% or more. In consideration of production cost, the upper limit of the content is 0.50%, and preferably 0.40%.

Cu: 0 to 0.50%

Cu (copper) is an element that increases the electrical resistance of a steel sheet and reduces the iron loss. It is not necessary to contain Cu, and the lower limit of the content is 0%. Although the Cu inclusion effect is obtained even if the amount is very small, in order to reliably obtain the inclusion effect, the Cu content is preferably 0.01% or more and more preferably 0.02% or more. In consideration of production cost, in order to prevent steel embrittlement, the upper limit of the content is 0.5000% or less and preferably 0.4000% or less.

Sn: 0 to 0.2000%
Sb: 0 to 0.2000%

Sn (tin) and Sb (antimony) are elements that exhibit preferable crystal orientation for magnetic characteristics. Therefore, as necessary, at least one of Sn and Sb may be contained. However, it is not necessary to contain Sn and Sb, and the lower limit of each content is 0%. Although the Sn and Sb inclusion effect is obtained even if the amount is very small, in order to reliably obtain the inclusion effect, the content of each of Sn and Sb is preferably 0.01% or more and more preferably 0.02% or more. In order to prevent deterioration of magnetic characteristics, the upper limit of the content of each of Sn and Sb is 0.2000% or less and preferably 0.1000% or less.

Ca: 0 to 0.0050%

Ca (calcium) is an element that coarsens sulfides, improves crystal grain growth in the heat treatment process and contributes to decreasing the iron loss. It is not necessary to contain Ca and the lower limit of the content is 0%. Although the Ca inclusion effect is obtained even if the amount is very small, in order to reliably obtain the inclusion effect, the Ca content is preferably 0.0005% or more and more preferably 0.0010% or more. In order to prevent deterioration of magnetic characteristics, the upper limit of the Ca content is preferably 0.0050% or less and more preferably 0.0030% or less.

Zn: 0 to 0.0050%

Zn (zinc) is an element that is contained as impurities. Zn combines with O in the base iron to form Zn oxides. Such inclusions inhibit crystal grain growth during annealing and deteriorate magnetic characteristics. Therefore, the upper limit of the Zn content is set to 0.0050% or less. The upper limit of the Zn content is preferably 0.0020% or less and more preferably 0.0010% or less. Since it is not necessary to contain Zn, the lower limit of the content is 0%. However, in consideration of refining cost, the lower limit of the Zn content is preferably 0.0003% or more and more preferably 0.0005% or more.

La: 0 to 0.0050%

La (lanthanum) is an element that coarsens sulfides, improves crystal grain growth in the heat treatment process and contributes to decreasing the iron loss. It is not necessary to contain La, and the lower limit of the content is 0%. Although the La inclusion effect is obtained even if the amount is very small, in order to reliably obtain the inclusion effect, the La content is preferably 0.0005% or more and more preferably 0.0010% or more. In order to prevent deterioration of magnetic characteristics, the upper limit of the La content is preferably 0.0050% or less and more preferably 0.0030% or less.

Ce: 0 to 0.0050%

Ce (cerium) is an element that coarsens sulfides, improves crystal grain growth in the heat treatment process, and contributes to decreasing the iron loss. It is not necessary to contain Ce and the lower limit of the content is 0%. Although the Ce inclusion effect is obtained even if the amount is very small, in order to reliably obtain the inclusion effect, the Ce content is preferably 0.0005% or more and more preferably 0.0010% or more. In order to prevent deterioration of magnetic characteristics, the upper limit of the Ce content is preferably 0.0050% or less and more preferably 0.0030% or less.

O: 0 to 0.1000%

Although O (oxygen) is also an impurity element, it is contained in a range of 0.1000% or less and does not affect properties of the non-oriented electrical steel sheet according to the present embodiment. Since 0 may be mixed into steel in the annealing process, even if the 0 content in the slab stage is in a range of 0.01% or less, it does not particularly affect properties of the non-oriented electrical steel sheet according to the present embodiment. However, in consideration of refining cost, the lower limit of the content may be preferably 0.0020% or more.

V: 0 to 0.1000%

V (vanadium) is an element that combines with carbon or nitrogen to form precipitates (carbides and nitrides), and contributes to increasing the strength, and these precipitates themselves deteriorate magnetic characteristics of the non-oriented electrical steel sheet. Therefore, the V content is set to 0.1000% or less. The V content is preferably 0.0050% or less and more preferably 0.0100% or less. The V content is more preferably equal to or less than the measurement limit, and specifically, more preferably 0.0001% or less. Since a lower V content is better, the V content may be 0%. However, in consideration of refining cost, the lower limit of the V content may be preferably 0.0010% or more.

W: 0 to 0.1000%

W (tungsten) is an element that combines with carbon to form precipitates (carbides) and contributes to increasing the strength. However, these precipitates themselves deteriorate magnetic characteristics of the non-oriented electrical steel sheet. Therefore, the W content is set to 0.1000% or less. The W content is preferably 0.0050% or less and more preferably 0.0010% or less. The W content is more preferably equal to or less than the measurement limit, and specifically, more preferably 0.0001% or less. Since a lower W content is better, the W content may be 0%. However, in consideration of refining cost, the lower limit of the W content may be preferably 0.0010% or more.

Zr: 0 to 0.1000%

Zr (zirconium) is an element that combines with carbon or nitrogen to form precipitates (carbides and nitrides), and contributes to increasing the strength, and these precipitates themselves deteriorate magnetic characteristics of the non-oriented electrical steel sheet. Therefore, the Zr content is set to 0.1000% or less. The Zr content is preferably 0.0050% or less and more preferably 0.0010% or less. In addition, the Zr content is more preferably equal to or less than the measurement limit, and specifically, more preferably 0.0001% or less. Since a lower Zr content is better, the Zr content may be 0%. However, in consideration of refining cost, the lower limit of the Zr content may be preferably 0.0010% or more.

Nb: 0 to 0.1000%

Nb (niobium) is an element that combines with carbon or nitrogen to form precipitates (carbides and nitrides), and contributes to increasing the strength, and these precipitates themselves deteriorate magnetic characteristics of the non-oriented electrical steel sheet. Therefore, the Nb content is set to 0.1000% or less. The Nb content is preferably 0.0050% or less and more preferably 0.0010% or less. In addition, the Nb content is more preferably equal to or less than the measurement limit, and specifically, more preferably 0.0001% or less Since a lower Nb content is better, the Nb content may be 0%. However, in consideration of refining cost, the lower limit of the Nb content may be preferably 0.0010% or more.

Mg: 0 to 0.1000%

Mg (magnesium) is an element that has functions of fixing S as sulfides or oxysulfides, minimizing fine precipitation of MnS and the like, and promoting recrystallization and crystal grain growth during final annealing. If the Mg content is more than 0.10%, since sulfides or oxysulfides are excessively generated, recrystallization and crystal grain growth during final annealing are inhibited, the Mg content is set to 0.1000% or less. The Mg content is preferably 0.0020% or less, and more preferably 0.0010% or less. The lower limit of the Mg content is not particularly limited and may be 0%. In order to preferably obtain the above effect, the Mg content may be 0.0005% or more. The Mg content is preferably 0.0010% or more.

The chemical composition of the base material of the non-oriented electrical steel sheet according to the present embodiment may contain, in addition to the above elements, as selective elements, for example, Bi (bismuth), Nd (neodymium), Y (yttrium), As (arsenic), Ga (gallium), Ge (germanium), Co (cobalt), Se (selenium), and Pb (lead). The content of these selective elements may be controlled based on known knowledge. For example, the contents of these selective elements may be as follows.

Bi: 0 to 0.1000%
Nd: 0 to 0.1000%
Y: 0 to 0.1000%
As: 0 to 0.1000%
Ga: 0 to 0.1000%
Ge: 0 to 0.1000%
Co: 0 to 0.1000%
Se: 0 to 0.1000%
Pb: 0 to 0.1000%

The Bi content is preferably 0.0100% or less and more preferably 0.005% or less. The Nd content is preferably 0.0100% or less and more preferably 0.0020% or less. The Y content is preferably 0.0010% or less. The contents of As, Ga, Ge, Co, Se, and Pb are each preferably 0.0100% or less and more preferably 0.005% or less. However, in consideration of refining cost, the contents of Bi, Nd, Y, As, Ga, Ge, Co, Se, and Pb each may be 0.0010% or more.

The chemical composition of the base material of the non-oriented electrical steel sheet according to the present embodiment may be measured using inductively coupled plasma-atomic emission spectrometry (ICP-AES). In addition, C and S may be measured using a combustion-infrared absorption method, N may be measured using an inert gas combustion-thermal conductivity method, and O may be measured using an inert gas fusion-nondispersive infrared absorption method.

Here, if a steel sheet to be measured has an insulation coating or the like on its surface, the chemical composition is measured after the coating or the like is removed. As a method for removing an insulation coating or the like of a non-oriented electrical steel sheet, for example, the following method may be exemplified.

First, a non-oriented electrical steel sheet having an insulation coating or the like is immersed in a sodium hydroxide solution and then washed. Finally, the sheet is dried with warm air. Thereby, it is possible to obtain a silicon steel sheet in which the insulation coating to be described below is removed.

Next, segregation of P in the non-oriented electrical steel sheet of the present embodiment will be described.

The non-oriented electrical steel sheet of the present embodiment contains P as an impurity or P that is intentionally added in a range of 0.10% or less. When P segregates at crystal grain boundaries, the impact resistance of the steel sheet decreases. Therefore, in the non-oriented electrical steel sheet of the present embodiment, P is prevented from segregating at crystal grain boundaries.

Specifically, a ratio $(P_{120B}/Fe_{700B})_B$ between a peak-to-peak height $Fe_{700B}$ of Fe at 700 eV and a peak-to-peak height $P_{120B}$ of P at 120 eV when crystal grain boundaries are measured through Auger electron spectroscopy is not more than twice a ratio $(P_{120i}/Fe_{700i})$; between a peak-to-peak height $Fe_{700i}$ of Fe at 700 eV and a peak-to-peak height $P_{120i}$ of P at 120 eV when the inside of crystal grains is measured through Auger electron spectroscopy. If $(P_{120B}/Fe_{700B})_B$ is not more than twice $(P_{120i}/F_{700i})_i$, it is possible to reduce segregation of P at crystal grain boundaries and improve the impact resistance of the steel sheet. In order to minimize segregation of P at crystal grain boundaries, the chemical components are adjusted as described above, and conditions for producing a non-oriented electrical steel sheet are optimized as described below.

In the measurement of a peak-to-peak height of P and a peak-to-peak height of Fe through Auger electron spectroscopy, $P_{120B}$ and $Fe_{700B}$ at grain boundaries and $P_{120i}$ and $Fe_{700i}$ within crystal grains are measured by the following method.

A non-oriented electrical steel sheet is cut in a cross section perpendicular to the sheet surface, and a plurality of coarse sample pieces of 18 mmL×4 mmW (L means the length in the rolling direction, and W means the sheet width) are collected. A test piece for Auger electron spectroscopy peak measurement is produced by notching a coarse sample piece in the center of the sample piece in the length direction. The produced test piece for Auger electron spectroscopy peak measurement is placed in an Auger electron spectroscopy device, the sample is cooled with liquid nitrogen, and the sample is fractured. Among the fractured cross sections, the grain boundary fractured surface (grain boundary) of the sample is found, and 10 points each at crystal grain boundaries and within the crystal grains are analyzed through Auger electron spectroscopy using the amount of P and the amount of Fe at grain boundaries as a guideline. Then, at the measurement point corresponding to the crystal grain boundary, a ratio $(P_{120B}/Fe_{700B})_B$ between a peak-to-peak height "$P_{120B}$" of P at 120 eV and a peak-to-peak height "$Fe_{700B}$" of Fe at 700 eV is determined and an average value is calculated. The term "peak-to-peak height" referred herein means, for example, in the case of P, a difference between two peaks, a maximum value (maximum peak) and a minimum value (minimum peak) formed at 120 eV.

Having high strength in the non-oriented electrical steel sheet of the present embodiment means that the tensile strength in the rolling direction is 550 MPa or more. The tensile strength is preferably 580 MPa or more. Here, the tensile strength is measured using JIS Z 2241 (2011) No. 13B tensile test piece.

Next, an impact test method for a non-oriented electrical steel sheet of the present embodiment will be described.

Generally, there is a Charpy impact test as specified in JIS Z 2242, but the non-oriented electrical steel sheet cannot be directly subjected to the impact test because it has a thin sheet thickness. In the present embodiment, a plurality of strip-shaped test pieces (10 mm×55 mm, with a V notch with a depth of 2 mm at an angle of 45° in the center) are cut out from the non-oriented electrical steel sheet, the pieces are laminated to produce a laminated block (laminate) with a height of 10 mm±0.2 mm, and the impact test is performed. The strip-shaped test piece is cut out so that its longitudinal direction is the rolling direction. However, since the direction in which the impact resistance is the weakest differs depending on the material, in that case, pieces may be collected so that the longitudinal direction of the test piece is the weakest direction. Here, within the scope of the present embodiment, since the direction in which the impact resistance is the weakest is the rolling direction, test pieces are collected so that the longitudinal direction (55 mm) of the test piece is the rolling direction. As a method for fixing test pieces in the laminate, a method of applying an anaerobic adhesive to a position 10 mm from both ends of a strip-shaped single sheet and performing adhering is used. As a method for evaluating the impact resistance, it is considered that it can be represented by impact absorption energy at room temperature, and evaluation is performed based on this method.

In the non-oriented electrical steel sheet according to the present embodiment, the base material (silicon steel sheet) preferably has an insulation coating on the surface. The non-oriented electrical steel sheet is used after lamination after the core is punched out. Therefore, when an insulation coating is provided on the surface of the base material, it is possible to reduce an Eddy current between sheets, and it is possible to reduce Eddy current loss of the core.

In the present embodiment, the type of the insulation coating is not particularly limited, and a known insulation coating used as the insulation coating of the non-oriented electrical steel sheet can be used. As such an insulation coating, for example, a composite insulation coating mainly composed of an inorganic substance and additionally containing an organic substance may be exemplified.

Here, the composite insulation coating is, for example, an insulation coating mainly composed of at least one of metal salts such as metal chromate and metal phosphate or inorganic substances such as colloidal silica, Zr compounds, and Ti compounds and in which fine organic resin particles are dispersed. Particularly, in order to reduce the environmental load during production, which has been in high demand in recent years, an insulation coating using metal phosphate and a Zr or Ti coupling agent as a starting material or an insulation coating using metal phosphate, and a carbonate or ammonium salt of a Zr or Ti coupling agent as a starting material is preferably used.

The adhesion amount of the insulation coating is not particularly limited, and for example, it is preferably about 200 to 1,500 mg/m 2 per surface and more preferably 300 to 1,200 mg/m 2 per surface. When an insulation coating is formed so that the adhesion amount is within the above range, it is possible to maintain exceptional uniformity. Here, when the adhesion amount of the insulation coating is measured afterwards, it is possible to use known various measurement methods, and for example, a method for measuring a mass difference before and after immersion in a sodium hydroxide solution or a fluorescent X-ray method using a calibration curve method may be appropriately used.

While the non-oriented electrical steel sheet according to the present embodiment has been described above, the average crystalline particle size of the non-oriented electrical steel sheet of the present embodiment is not particularly limited. However, when the average crystalline particle size can be reduced without coarsening crystal grains, there is a concern of the iron loss deteriorating. On the other hand, when crystal grains excessively coarsen and the average crystalline particle size is too large, not only processability may deteriorate but also Eddy current loss may deteriorate. Therefore, the average crystalline particle size of the non-oriented electrical steel sheet is preferably 10 μm to 60 mu.

The average crystalline particle size can be measured, for example, in an arbitrary cross section by a cutting method in JIS G 0551 (2020).

In addition, the sheet thickness of the non-oriented electrical steel sheet according to the present embodiment is not particularly limited. Generally, if the sheet thickness is thin, the iron loss decreases, but the magnetic flux density decreases. Based on this point, if the sheet thickness is 0.15 mm or more, the iron loss is lower and the magnetic flux density is higher. In addition, if the sheet thickness is 0.27 mm or less, it is possible to maintain low iron loss. Therefore, the sheet thickness of the non-oriented electrical steel sheet according to the present embodiment is preferably 0.15 to 0.27 mm and more preferably 0.20 to 0.25 mm.

Next, a preferable method for producing a non-oriented electrical steel sheet of the present embodiment and a method for producing an electric motor including a stator core made of the obtained non-oriented electrical steel sheet will be described.

The non-oriented electrical steel sheet of the present embodiment is produced when a slab having the above chemical composition is heated and then hot-rolled to obtain a hot-rolled steel sheet, the obtained hot-rolled steel sheet is wound and cooled, the cooled hot-rolled steel sheet is cold-rolled, and the cold-rolled steel sheet is finally annealed. Specifically, the production method for a non-oriented electrical steel sheet of the present embodiment includes a hot rolling process in which a steel slab having the above chemical components is hot-rolled to obtain a hot-rolled steel sheet, a winding process in which the hot-rolled steel sheet is wound and cooled and a cold rolling process in which the cooled hot-rolled steel sheet is cold-rolled to obtain a cold-rolled steel sheet, and a final annealing process in which the cold-rolled steel sheet is finally annealed. Hot-band annealing may be omitted. In this case, in cooling in the winding process of the hot-rolled steel sheet, the residence time in a temperature range of 500 to 200° C. (low temperature side) is longer than the residence time in a temperature range of 700° C. to 500° C. (high temperature side), and the residence time in a temperature range of 500 to 200° C. is 100 seconds or longer. Here, the upper limit of the residence time is not set. However, there is no need for it to be left for too long in consideration of an operational point of view, and the upper limit may be, for example, about 10,000 seconds. Regarding cooling in the winding process, the residence time in each temperature range will be described below in detail. In addition, in the final annealing process, the maximum temperature is lower than 900° C., and the average cooling rate in a range of 700 to 500° C. in the cooling procedure is 20° C./sec or faster.

In addition, another method for producing a non-oriented electrical steel sheet of the present embodiment may include annealing of a hot-rolled steel sheet (hot-band annealing). That is, a sheet may be produced when a slab having the above chemical composition is heated and then hot-rolled to obtain a hot-rolled steel sheet, the obtained hot-rolled steel sheet is wound and cooled, annealing is performed by heating and cooling the cooled hot-rolled steel sheet, the annealed hot-rolled steel sheet is cold-rolled, the cold-rolled steel sheet is finally annealed. Specifically, another method for producing a non-oriented electrical steel sheet of the present embodiment includes a hot rolling process in which a steel slab having the above chemical components is hot-rolled to obtain a hot-rolled steel sheet, a winding process in which the hot-rolled steel sheet is wound and cooled, a hot-band annealing process in which the cooled hot-rolled steel sheet is heated and cooled, a cold rolling process in which the hot-rolled steel sheet after the hot-band annealing process is cold-rolled to obtain a cold-rolled steel sheet and a final annealing process in which the cold-rolled steel sheet is finally annealed. In this case, in cooling in annealing (hot-band annealing) of the hot-rolled steel sheet, the residence time in a temperature range of 500 to 200° C. (low temperature side) is longer than the residence time in a temperature range of 700° C. to 500° C. (high temperature side), and the residence time in a temperature range of 500 to 200° C. is 10 seconds or longer. Here, the upper limit of the residence time in the above temperature range when hot-band annealing is performed is not set. However, there is no need for it to be left for too long in consideration of an operational point of view, and the upper limit may be, for example, about 10,000 seconds. Regarding cooling in the winding process, the residence time in each temperature range will be described below in detail. In addition, in the final annealing, the maximum temperature is lower than 900° C., and the average cooling rate in a range of 700 to 500° C. in the cooling procedure is 20° C./sec or faster.

The slab can be obtained by a general method such as a continuous casting method of steel having the above chemical composition or a method of blooming rolling a steel ingot. Then, the slab is put into a heating furnace and heated and then hot-rolled to obtain a hot-rolled steel sheet. However, when the slab temperature is high, hot rolling may be performed without putting the slab into the heating furnace. According to this process, a hot-rolled steel sheet is obtained. The heating temperature of the slab is not particularly limited and is preferably 1,000 to 1,300° C. in consideration of cost and hot rolling properties.

After a steel slab is produced, the steel slab is heated again and hot-rolled to obtain a hot-rolled steel sheet. Hot rolling conditions are not particularly limited. For example, the final rolling temperature during final rolling may be 700 to 1,050° C. In addition, the sheet thickness of the hot-rolled steel sheet after hot rolling is not particularly specified, but in consideration of the efficiency of hot rolling and subsequent processes, for example, about 1.5 to 3.0 mm is preferable.

Subsequently, the hot-rolled steel sheet after hot rolling is wound and cooled. The winding temperature may be, for example, 700 to 1,000° C. When hot-band annealing to be described below is omitted, in cooling in the winding process of the hot-rolled steel sheet, the residence time in a temperature range of 500 to 200° C. (low temperature side) is longer than the residence time at 700° C. to 500° C. (high temperature side), and the residence time in a temperature range of 500 to 200° C. is 100 seconds or longer. During the residence time at 700 to 500° C. (high temperature side), some P partially segregates at grain boundaries. However, when the residence time at 500° C. to 200° C. (low temperature side) is sufficiently lengthened, segregation of C at crystal grain boundaries is promoted during the residence time at 500° C. to 200° C., and as a result, it is possible to minimize segregation of P at grain boundaries again during final annealing. On the other hand, when the residence time at 500° C. to 200° C. is too short, segregation of C is reduced and P tends to segregate at grain boundaries. In addition, even if the residence time on the low temperature side is long, if the residence time is shorter than the residence time on the high temperature side, it is difficult to sufficiently avoid segregation of P on the high temperature side. In this regard, the upper limit of the residence time at 700° C. to 500° C. (high temperature side) is 200 seconds or shorter and the difference between the residence times on the high temperature side and the low temperature side is preferably 10% or more of the residence time on the high temperature side. The lower limit of the residence time at 700° C. to 500° C. (high temperature side) is not particularly limited and may be 80 seconds or longer in consideration of an operational point of view.

After cooling, hot-band annealing may be performed. Hot-band annealing can be performed by, for example, continuous annealing in which the temperature is maintained at 950° C. or higher and 1,050° C. or lower for 10 seconds or longer and 3 minutes or shorter. Alternatively, hot-band annealing may be performed by batch annealing in which the temperature is maintained at 750° C. or higher and 900° C. or lower for 1 hour or longer.

When hot-band annealing is performed, in the subsequent cooling, the residence time in a temperature range of 500 to 200° C. (low temperature side) is longer than the residence time in a temperature range at 700 to 500° C. (high temperature side), and the residence time in a temperature range of 500 to 200° C. is 10 seconds or longer. When the residence time on the low temperature side is too short, P tends to segregate at grain boundaries. The upper limit of the residence time in the cooling procedure when hot-band annealing is performed is not set. However, in consideration of an operational point of view, there is no need for it to be left for too long, and there is no need for it to be left for too long, for example, longer than 10,000 seconds. Here, compared to after hot rolling in which there are many segregation sites other than crystal grain boundaries due to recovery at high temperatures and remaining uncrystallized parts, after hot-band annealing, grain regulation is promoted due to recrystallization, and thus precipitation sites are limited. In addition, after hot-band annealing, the degree of segregation near grain boundaries is high due to a drag effect during grain growth. Therefore, it is thought that segregation of P can be reduced during hot-band annealing even if the residence time is short. In addition, similarly to the case in which hot-band annealing is omitted (refer to the above), even if the residence time on the low temperature side is long, if the residence time is shorter than the residence time on the high temperature side, it is difficult to sufficiently avoid segregation of P on the high temperature side. In this regard, the upper limit of the residence time at 700° C. to 500° C. (high temperature side) is seconds or shorter and the difference between the residence times on the high temperature side and the low temperature side is preferably 10% or more of the residence time on the high temperature side. The lower limit of the residence time at 700° C. to 500° C. (high temperature side) is not particularly limited and may be 5 seconds or longer in consideration of an operational point of view.

Subsequently, the hot-rolled steel sheet is cold-rolled. Cold rolling can be performed, for example in a temperature range of room temperature to 300° C. at a total rolling reduction rate of 70 to 90%. Particularly, in the case of a thin electrical steel sheet, the total rolling reduction rate may be 80% or more. The total rolling reduction rate in cold rolling is preferably 90% or less in consideration of the capacity of a rolling mill and production control such as sheet thickness accuracy. Here, as necessary, the hot-rolled steel sheet may be pickled and then cold-rolled. The rolling reduction rate in cold rolling is not particularly limited.

After cold rolling, the steel sheet is finally annealed to obtain a non-oriented electrical steel sheet. In the final annealing process, the maximum temperature is lower than 900° C., and the average cooling rate in a range of 700 to 500° C. in the cooling procedure is 20° C./sec or faster. Thereby, it prevents P from diffusing and segregating at grain boundaries. If the maximum temperature is higher than 900° C., the segregated C may be diffused and homogenized, and segregation of P at grain boundaries may be promoted. Therefore, the maximum temperature in the final annealing process is preferably 880° C. or lower and more preferably lower than 850° C. Here, the lower limit of the maximum temperature is not particularly limited, and is preferably, 700° C. or higher in consideration of magnetic characteristics. If the maximum temperature is lower than 700° C., recrystallization and crystal grain growth become insufficient and the iron loss is poor.

In addition, a range of 700 to 500° C. in the cooling procedure of the final annealing process is an important temperature range for controlling P diffusion behavior. That is, in order to minimize diffusion of P and minimize segregation of P at grain boundaries, it is effective to increase the average cooling rate in a temperature range of 700 to 500° C. in the cooling procedure. Therefore, the average cooling rate in a range of 700 to 500° C. in the cooling procedure is 20° C./sec or faster. The average cooling rate in a range of 700 to 500° C. in the cooling procedure is preferably 25° C./sec or faster and more preferably 30° C./sec or faster.

Here, the average heating rate during heating in final annealing is not particularly limited and may be 20 to 1,000° C./sec in order to obtain a favorable magnetic flux density.

In addition, the annealing atmosphere in the final annealing process is not particularly limited and is preferably a reducing atmosphere in order to minimize segregation of P at grain boundaries. Specifically, a dry nitrogen and hydrogen mixed atmosphere is preferable, and $PH_2O/PH_2$ as a water vapor partial pressure is preferably or less. If the annealing atmosphere is an oxidizing atmosphere, decarburization occurs, and segregation of C at grain boundaries in which segregation of P at grain boundaries is minimized is reduced. As a result, segregation of P at grain boundaries is promoted.

The non-oriented electrical steel sheet of the present embodiment produced as described above has a high tensile strength of 550 MPa or more and high impact resistance.

An electric motor can be produced using the non-oriented electrical steel sheet of the present embodiment. For the core of the electric motor, the non-oriented electrical steel sheet having the above chemical composition of the present embodiment is processed into a core shape to produce a core original sheet, and a plurality of core original sheets are laminated to form a core material. In the core, the rotor core may be used without annealing the core material. On the other hand, the stator core is used after strain relief annealing (core annealing) for heating and cooling a core material (stator core material) is performed, and an electric motor with even lower iron loss can be obtained.

In this case, in the strain relief annealing of the stator core material, the heating temperature is 750 to 850° C., and the average cooling rate in a range of 700 to 500° C. in the cooling procedure is 5° C./min or shorter. Thereby, a ratio $(P_{120B}/Fe_{700B})_{SB}$ between a peak-to-peak height $Fe_{700SB}$ of Fe at 700 eV and a peak-to-peak height $P_{120SB}$ of P at 120 eV when crystal grain boundaries of the stator core are measured through Auger electron spectroscopy can be not more than 4 times a ratio $(P_{120Si}/Fe_{700Si})_{Si}$ between a peak-to-peak height $Fe_{700Si}$ of Fe at 700 eV and a peak-to-peak height $P_{120Si}$ of P at 120 eV when the inside of crystal grains is measured through Auger electron spectroscopy. In addition, it is possible to obtain a high-strength stator core having a tensile strength of 500 MPa or more. The lower limit of the average cooling rate in a range of 700 to 500° C. in the cooling procedure of strain relief annealing is not particularly limited and may be 1° C./min or faster because productivity is inhibited even if the time is excessively long.

That is, after strain relief annealing for removing the working strain introduced into the non-oriented electrical steel sheet when it is processed as a member (core), unlike the case of the above non-oriented electrical steel sheet, it is preferable to segregate P at grain boundaries. The reason for this is that, when P segregates at grain boundaries, precipitation of carbides such as TiC at crystal grain boundaries can be minimized, and the iron loss can be improved. In addition, according to the strain relief annealing, when the amount of Si and Mn increases, an effect of promoting segregation of P at grain boundaries is obtained, and a favorable effect is obtained unlike the case of production of the non-oriented electrical steel sheet.

EXAMPLES

Hereinafter, the present disclosure will be described in detail with reference to examples. Here, the conditions in the examples indicate that they are examples used for confirming the feasibility and effects of the present disclosure, and the present disclosure is not limited by the conditions of these examples. Various conditions can be used in the present disclosure as long as it achieves its purpose without departing from the spirit and scope of the present disclosure.

The slabs having components shown in Table 1A and Table 1B were subjected to hot rolling (sheet thickness of hot-band 2.0 mm), hot-band annealing, cold rolling (total rolling reduction rate: 87.5%), and final annealing to produce non-oriented electrical steel sheets having a sheet thickness of 0.25 mm. In the final annealing, the average heating rate up to the maximum temperature shown in Table 1 was 50° C./sec, and the annealing atmosphere was 20% $H_2$+80% $N_2$ ($PH_2O/PH_2$=0.03). Here, the underlines in the chemical compositions of Table 1A and Table 1B indicate that the composition is outside the scope of the present invention, and "–" indicates that a corresponding element content is 0% in a specified significant digit (numerical value to the least significant digit) in the embodiment. In addition, "<0.0001" in the amount of B in Table 1 means that it is less than the detection limit value (0.0001%).

The residence times at 700 to 500° C. (high temperature side) and 500 to 200° C. (low temperature side) in cooling for hot-band annealing, the maximum temperature for final annealing, and the average cooling rate were set according to conditions shown in Table 2. Here, in Nos. 4 and 7, hot-band annealing was omitted. "Residence time" of Nos. 4 and 7 indicates the residence times at 700 to 500° C. and 500 to 200° C. in cooling after winding the hot-rolled steel sheet.

The tensile strength and the impact absorption energy of the obtained non-oriented electrical steel sheet, and the ratio $P_{120}/Fe_{700}$ between crystal grain boundaries and the inside of crystal grains were measured by the above methods. The results are shown in Table 2.

Here, "grain boundary/within grains" in "after final annealing" Table 2 means $\{(P_{120B}/Fe_{700B})_B/(P_{120i}/Fe_{700i})_i\}$, and "grain boundary/within grains" in "after core annealing" means $\{(P_{120B}/Fe_{700SB})_{SB}/(P_{120Si}/Fe_{700Si})_{Si}\}$.

If the impact absorption energy was 200 J/cm² or more, it was determined that the impact resistance was exceptional.

In addition, the obtained non-oriented electrical steel sheet was processed into a stator core shape to produce a stator core material and subjected to strain relief annealing (core annealing) for heating and cooling. The heating temperature in the strain relief annealing was 800° C., and the average cooling rate in a range of 700 to 500° C. was 3° C./min. The hysteresis loss (Wh10/400) at 400 Hz was obtained for the processed product after strain relief annealing. The results are shown in Table 2. If Wh10/400 was less than 5.6 W/kg, it was determined that magnetic characteristics were exceptional.

Here, the hysteresis loss was measured by the following method. The iron loss (Wh10/400) of the processed product after strain relief annealing was 400 times Wh10/1 measured according to JIS C 2550 DC-measurement.

The underlines in Table 2 indicate that the values were outside the scope of the present invention or desired properties were not obtained.

According to the present invention, it was confirmed that a non-oriented electrical steel sheet having high strength and exceptional impact resistance could be obtained. In addition, it was confirmed that the stator core made of the non-oriented electrical steel sheet of the present invention had exceptional magnetic characteristics.

TABLE 1A

| Steel type | C | Si | sol. Al | Mn | Cr | P | S | O | N | Ti | Mo | B | Ni | Cu | Sn | Sb | Ca |
|---|---|---|---|---|---|---|---|---|---|---|---|---|---|---|---|---|---|
| A | 0.0020 | 3.3 | 0.3 | 1.0 | 0.05 | 0.01 | 0.0010 | 0.0023 | 0.0014 | 0.0010 | 0.0053 | <0.0001 | — | — | — | — | — |
| B | 0.0018 | 3.7 | 0.3 | 0.9 | 0.03 | 0.01 | 0.0006 | 0.0019 | 0.0028 | 0.0010 | 0.0143 | 0.0001 | 0.05 | 0.06 | — | — | — |
| C | 0.0017 | 3.4 | 1.2 | 0.5 | — | 0.04 | 0.0022 | 0.0122 | 0.0026 | 0.0024 | 0.0836 | 0.0002 | — | — | — | — | 0.0010 |
| D | 0.0022 | 3.8 | 0.2 | 1.1 | 0.01 | 0.01 | 0.0013 | 0.0031 | 0.0018 | 0.0007 | 0.0273 | 0.0008 | — | — | — | — | — |
| E | 0.0012 | 3.2 | 0.8 | 0.3 | 0.09 | 0.07 | 0.0027 | 0.0321 | 0.0024 | 0.0017 | 0.0240 | 0.0004 | — | — | — | — | — |
| F | 0.0025 | 3.4 | 0.7 | 0.5 | 0.05 | 0.02 | 0.0007 | 0.0027 | 0.0021 | 0.0011 | 0.0008 | 0.0004 | — | — | — | — | — |
| G | 0.0024 | 3.3 | 0.5 | 0.6 | 0.12 | 0.01 | 0.0012 | 0.0031 | 0.0027 | 0.0012 | 0.0147 | 0.0007 | — | — | — | — | — |
| H | 0.0018 | 3.2 | 1.1 | 0.5 | 0.05 | 0.01 | 0.0032 | 0.0029 | 0.0024 | 0.0012 | 0.0226 | 0.0006 | — | — | — | — | — |
| I | 0.0021 | 3.4 | 0.7 | 0.7 | 0.06 | 0.02 | 0.0018 | 0.0017 | 0.0022 | 0.0016 | 0.0253 | 0.0013 | — | — | — | — | — |
| J | 0.0024 | 3.1 | 0.4 | 0.2 | 0.05 | 0.05 | 0.0011 | 0.0032 | 0.0022 | 0.0014 | 0.0154 | 0.0002 | — | — | — | — | — |
| K | 0.0037 | 4.3 | 0.2 | 0.2 | 0.02 | 0.01 | 0.0007 | 0.0023 | 0.0016 | 0.0013 | 0.0047 | 0.0004 | — | — | 0.0127 | 0.0040 | 0.0004 |
| L | 0.0025 | 3.2 | 1.8 | 3.1 | 0.02 | 0.02 | 0.0016 | 0.0034 | 0.0014 | 0.0014 | 0.0133 | 0.0001 | — | — | — | — | — |
| M | 0.0024 | 3.4 | 0.3 | 0.5 | 0.04 | 0.01 | 0.0013 | 0.0027 | 0.0024 | 0.0013 | 0.0117 | 0.0003 | — | — | — | — | — |
| N | 0.0023 | 3.3 | 0.2 | 0.2 | 0.02 | 0.01 | 0.0014 | 0.0026 | 0.0021 | 0.0013 | 0.0057 | 0.0002 | — | — | — | — | — |
| O | 0.0031 | 3.3 | 0.3 | 0.4 | 0.03 | 0.01 | 0.0011 | 0.0041 | 0.0011 | 0.0017 | 0.0147 | <0.0001 | — | — | 0.0360 | 0.0041 | — |

TABLE 1B

| Steel type | Zn | La | Ce | V | W | Zr | Nb | Mg | Bi |
|---|---|---|---|---|---|---|---|---|---|
| A | — | — | — | — | — | — | — | — | — |
| B | — | — | — | — | — | — | — | — | — |
| C | — | — | — | — | — | — | — | — | — |
| D | — | — | — | — | — | — | — | — | — |
| E | — | 0.0010 | 0.0010 | — | — | — | — | — | — |
| F | — | — | — | — | — | — | — | — | — |
| G | — | — | — | — | — | — | — | — | — |
| H | — | — | — | — | — | — | — | — | — |
| I | — | — | — | — | — | — | — | — | — |
| J | — | — | — | — | — | — | — | — | — |
| K | — | — | — | — | — | — | — | 0.0005 | — |
| L | 0.0017 | — | — | — | — | 0.0013 | 0.0008 | — | 0.0011 |
| M | — | — | — | — | — | — | — | — | — |
| N | — | — | — | — | — | — | — | — | — |
| O | 0.0007 | — | — | 0.0007 | 0.0009 | — | — | — | — |

| Steel type | Nd | Y | Ga | Ge | Co | Se | Pb | As |
|---|---|---|---|---|---|---|---|---|
| A | — | — | — | — | — | — | — | — |
| B | — | — | — | — | — | — | — | — |
| C | — | — | — | — | — | — | — | — |
| D | — | — | — | — | — | — | — | — |
| E | — | — | — | — | — | — | — | — |
| F | — | — | — | — | — | — | — | — |
| G | — | — | — | — | — | — | — | — |
| H | — | — | — | — | — | — | — | — |
| I | — | — | — | — | — | — | — | — |
| J | — | — | — | — | — | — | — | — |
| K | 0.0006 | — | — | — | — | — | 0.0005 | 0.0050 |
| L | — | 0.0012 | 0.0014 | 0.0011 | — | — | — | — |
| M | — | — | — | — | — | — | — | — |

TABLE 1B-continued

| | | | | | | | | |
|---|---|---|---|---|---|---|---|---|
| N | — | — | — | — | — | — | — | — |
| O | — | — | — | — | 0.0030 | 0.0014 | — | — |

TABLE 2

| No. | Steel type | Hot-band annealing | | | | Final annealing | |
|---|---|---|---|---|---|---|---|
| | | Heating time (° C.) | Maintenance time (sec) | Residence time at 700 to 500° C. (sec) | Residence time at 500 to 200° C. (sec) | Maximum temperature (° C.) | Average cooling rate (° C./s) |
| 1 | A | 950 | 40 | 13 | 15 | 810 | 25 |
| 2 | A | 950 | 20 | 5 | 8 | 800 | 25 |
| 3 | A | 975 | 60 | 13 | 15 | 910 | 25 |
| 4 | A | No | No | 130 | 150 | 820 | 25 |
| 5 | B | 1000 | 40 | 12 | 15 | 850 | 25 |
| 6 | B | 950 | 40 | 13 | 15 | 830 | 17 |
| 7 | B | No | No | 70 | 80 | 850 | 25 |
| 8 | B | No | No | 150 | 110 | 800 | 23 |
| 9 | C | 970 | 100 | 11 | 15 | 870 | 25 |
| 10 | C | 950 | 150 | 10 | 15 | 910 | 25 |
| 11 | D | 975 | 40 | 11 | 15 | 850 | 25 |
| 12 | E | 1025 | 50 | 11 | 15 | 850 | 25 |
| 13 | F | 1050 | 40 | 14 | 15 | 850 | 25 |
| 14 | G | 950 | 200 | 10 | 15 | 850 | 25 |
| 15 | H | 975 | 50 | 13 | 15 | 850 | 25 |
| 16 | I | 950 | 60 | 13 | 15 | 850 | 25 |
| 17 | J | 1000 | 40 | 12 | 15 | 890 | 25 |
| 18 | K | 1025 | 60 | 10 | 20 | 750 | 30 |
| 19 | L | 950 | 40 | 11 | 15 | 800 | 25 |
| 20 | M | 975 | 50 | 25 | 20 | 890 | 25 |
| 21 | N | 1000 | 70 | 10 | 20 | 900 | 25 |
| 22 | O | 1000 | 60 | 15 | 20 | 800 | 30 |

| No. | After final annealing | | After core annealing | | | Note |
|---|---|---|---|---|---|---|
| | TS (MPa) | Impact absorption energy (J/cm$^2$) | ($P_{120}/Fe_{700}$) Grain boundaries/within grains | TS (MPa) | ($P_{120}/Fe_{700}$) Grain boundaries/within grains | Wh10/400 (W/kg) | |
| 1 | 599 | 244 | 1.2 | 547 | 4.9 | 5.2 | Invention Example |
| 2 | 594 | 154 | 2.1 | 543 | 4.5 | 5.3 | Comparative Example |
| 3 | 564 | 151 | 2.1 | 545 | 4.2 | 5.5 | Comparative Example |
| 4 | 589 | 254 | 1.1 | 544 | 4.7 | 5.3 | Invention Example |
| 5 | 625 | 233 | 1.4 | 589 | 4.7 | 5.3 | Invention Example |
| 6 | 627 | 114 | 2.5 | 590 | 5.1 | 5.2 | Comparative Example |
| 7 | 624 | 126 | 2.9 | 587 | 4.8 | 5.2 | Comparative Example |
| 8 | 635 | 113 | 2.4 | 588 | 4.8 | 5.2 | Comparative Example |
| 9 | 632 | 201 | 1.7 | 600 | 5.2 | 5.3 | Invention Example |
| 10 | 617 | 127 | 2.8 | 603 | 5.2 | 5.2 | Comparative Example |
| 11 | 636 | 256 | 1.1 | 564 | 4.1 | 5.5 | Invention Example |
| 12 | 600 | 204 | 1.7 | 570 | 5.4 | 5.1 | Invention Example |
| 13 | 607 | 141 | 2.3 | 549 | 4.3 | 5.4 | Comparative Example |
| 14 | 585 | 135 | 2.5 | 565 | 4.2 | 5.5 | Comparative Example |

TABLE 2-continued

| | | | | | | | |
|---|---|---|---|---|---|---|---|
| 15 | 601 | 129 | 2.5 | 575 | 3.7 | 5.8 | Comparative Example |
| 16 | 611 | 125 | 2.7 | 524 | 3.4 | 5.9 | Comparative Example |
| 17 | 545 | 201 | 1.1 | 525 | 3.4 | 6.0 | Comparative Example |
| 18 | 705 | 243 | 1.1 | 636 | 4.8 | 5.3 | Invention Example |
| 19 | 710 | 172 | 1.8 | 656 | 4.7 | 5.3 | Invention Example |
| 20 | 564 | 145 | 2.3 | 548 | 3.9 | 5.7 | Comparative Example |
| 21 | 542 | 153 | 2.1 | 526 | 4.8 | 5.2 | Comparative Example |
| 22 | 596 | 223 | 1.4 | 535 | 5.1 | 5.2 | Invention Example |

The invention claimed is:

1. A non-oriented electrical steel sheet comprising a base material having a chemical composition including, in mass %,
    C: 0.0010 to 0.0040%,
    Si: 3.2 to 4.5%,
    sol. Al: 0.2 to 2.0%,
    Mn: 0.1 to 3.5%,
    P: more than 0% and 0.10% or less,
    S: 0 to 0.0030%,
    N: 0 to 0.0030%,
    Ti: 0 to 0.0030%,
    Mo: 0.0010 to 0.1000%,
    Cr: 0 to 0.10%,
    B: 0 to 0.0010%,
    Ni: 0 to 0.50%,
    Cu: 0 to 0.50%,
    Sn: 0 to 0.2000%,
    Sb: 0 to 0.2000%,
    Ca: 0 to 0.0050%,
    Zn: 0 to 0.0050%,
    La: 0 to 0.0050%,
    Ce: 0 to 0.0050%,
    O: 0 to 0.1000%,
    V: 0 to 0.1000%,
    W: 0 to 0.1000%,
    Zr: 0 to 0.1000%,
    Nb: 0 to 0.1000%,
    Mg: 0 to 0.1000%,
    Bi: 0 to 0.1000%,
    Nd: 0 to 0.1000%,
    Y: 0 to 0.1000%,
    As: 0 to 0.1000%,
    Ga: 0 to 0.1000%,
    Ge: 0 to 0.1000%,
    Co: 0 to 0.1000%,
    Se: 0 to 0.1000%,
    Pb; 0 to 0.1000%, and
    the remainder: Fe and impurities,
    wherein the non-oriented electrical steel sheet has a tensile strength of 550 MPa or more, and
    a ratio $(P_{120B}/Fe_{700B})_B$ between a peak-to-peak height $Fe_{700B}$ of Fe at 700 eV and a peak-to-peak height $P_{120B}$ of P at 120 eV when crystal grain boundaries are measured through Auger electron spectroscopy is not more than twice a ratio $(P_{120i}/Fe_{700i})_i$ between a peak-to-peak height $Fe_{700i}$ of Fe at 700 eV and a peak-to-peak height $P_{120i}$ of P at 120 eV when the inside of crystals is measured through Auger electron spectroscopy.

2. The non-oriented electrical steel sheet according to claim 1, which contains one or more selected from the group consisting of, in mass %,
    Ni: 0.01 to 0.50%,
    Cu: 0.01 to 0.50%,
    Sn: 0.01 to 0.2000%,
    Sb: 0.01 to 0.2000%,
    Ca: 0.0005 to 0.0050%,
    Zn: 0.0003 to 0.0050%,
    La: 0.0005 to 0.0050%,
    Ce: 0.0005 to 0.0050%,
    O: 0.0020 to 0.1000%,
    V: 0.0010 to 0.0100%,
    W: 0.0010 to 0.0100%,
    Zr: 0.0010 to 0.0100%,
    Nb: 0.0010 to 0.0100%,
    Mg: 0.0010 to 0.0100%,
    Bi: 0.0010 to 0.0100%,
    Nd: 0.0010 to 0.0100%,
    Y: 0.0010 to 0.0100%,
    As: 0.0010 to 0.0100%,
    Ga: 0.0010 to 0.0100%,
    Ge: 0.0010 to 0.0100%,
    Co: 0.0010 to 0.0100%,
    Se: 0.0010 to 0.0100%,
    Pb; 0.0010 to 0.0100%.

3. The non-oriented electrical steel sheet according to claim 1 or 2,
    wherein the base material has an insulation coating on its surface.

4. An electric motor comprising a stator core,
    wherein the stator core has a chemical composition including, in mass %,
    C: 0.0010 to 0.0040%,
    Si: 3.2 to 4.5%,
    sol. Al: 0.2 to 2.0%,
    Mn: 0.1 to 3.5%,
    P: more than 0% and 0.10% or less,
    S: 0 to 0.0030%,
    N: 0 to 0.0030%,
    Ti: 0 to 0.0030%,
    Mo: 0.0010 to 0.1000%,
    Cr: 0 to 0.10%,
    B: 0 to 0.0010%,
    Ni: 0 to 0.50%,
    Cu: 0 to 0.50%,
    Sn: 0 to 0.2000%,
    Sb: 0 to 0.2000%,
    Ca: 0 to 0.0050%,
    Zn: 0 to 0.0050%, La: 0 to 0.0050%,
Ce: 0 to 0.0050%,
O: 0 to 0.1000%,
V: 0 to 0.1000%,
W: 0 to 0.1000%,
Zr: 0 to 0.1000%,
Nb: 0 to 0.1000%,
Mg: 0 to 0.1000%,
Bi: 0 to 0.1000%,
Nd: 0 to 0.1000%,
Y: 0 to 0.1000%,
As: 0 to 0.1000%,
Ga: 0 to 0.1000%,
Ge: 0 to 0.1000%,
Co: 0 to 0.1000%,
Se: 0 to 0.1000%,
Pb; 0 to 0.1000%, and
the remainder: Fe and impurities,
wherein the stator core has a tensile strength of 500 MPa or more, and
a ratio $(P_{120SB}/Fe_{700SB})_{SB}$ between a peak-to-peak height $Fe_{700SB}$ of Fe at 700 eV and a peak-to-peak height $P_{120SB}$ of P at 120 eV when crystal grain boundaries of the stator core are measured through Auger electron spectroscopy is not more than 4 times a ratio $(P_{120Si}/Fe_{700Si})_{Si}$ between a peak-to-peak height $Fe_{700Si}$ of Fe at 700 eV and a peak-to-peak height $P_{120Si}$ of P at 120 eV when the inside of crystals is measured through Auger electron spectroscopy.

5. A method for producing the non-oriented electrical steel sheet according to claim 1, comprising:
a hot rolling process in which a steel slab having a chemical composition, including, in mass %,
C: 0.0010 to 0.0040%,
Si: 3.2 to 4.5%,
sol. Al: 0.2 to 2.0%,
Mn: 0.1 to 3.5%,
P: more than 0% and 0.10% or less,
S: 0 to 0.0030%,
N: 0 to 0.0030%,
Ti: 0 to 0.0030%,
Mo: 0.0010 to 0.1000%,
Cr: 0 to 0.10%,
B: 0 to 0.0010%,
Ni: 0 to 0.50%,
Cu: 0 to 0.50%,
Sn: 0 to 0.2000%,
Sb: 0 to 0.2000%,
Ca: 0 to 0.0050%,
Zn: 0 to 0.0050%,
La: 0 to 0.0050%,
Ce: 0 to 0.0050%,
O: 0 to 0.1000%,
V: 0 to 0.1000%,
W: 0 to 0.1000%,
Zr: 0 to 0.1000%,
Nb: 0 to 0.1000%,
Mg: 0 to 0.1000%,
Bi: 0 to 0.1000%,
Nd: 0 to 0.1000%,
Y: 0 to 0.1000%,
As: 0 to 0.1000%,
Ga: 0 to 0.1000%,
Ge: 0 to 0.1000%,
Co: 0 to 0.1000%,
Se: 0 to 0.1000%,
Pb: 0 to 0.1000%, and
the remainder: Fe and impurities is hot-rolled to obtain a hot-rolled steel sheet;
a winding process in which the hot-rolled steel sheet is wound and cooled;
a cold rolling process in which the cooled hot-rolled steel sheet is cold-rolled to obtain a cold-rolled steel sheet; and
a final annealing process in which the cold-rolled steel sheet is finally annealed,
wherein, in cooling in the winding process of the hot-rolled steel sheet, a residence time in a temperature range of 500 to 200° C. is longer than a residence time in a temperature range of 700 to 500° C., and the residence time in a temperature range of 500 to 200° C. is 100 seconds or longer, and
wherein, in the final annealing process, a maximum temperature is lower than 900° C., and an average cooling rate in a range of 700 to 500° C. is 20° C./sec or faster.

6. A method for producing the non-oriented electrical steel sheet according to claim 1, comprising:
a process in which a steel slab having a chemical composition, including, in mass %,
C: 0.0010 to 0.0040%,
Si: 3.2 to 4.5%,
sol. Al: 0.2 to 2.0%,
Mn: 0.1 to 3.5%,
P: more than 0% and 0.10% or less,
S: 0 to 0.0030%,
N: 0 to 0.0030%,
Ti: 0 to 0.0030%,
Mo: 0.0010 to 0.1000%,
Cr: 0 to 0.10%,
B: 0 to 0.0010%,
Ni: 0 to 0.50%,
Cu: 0 to 0.50%,
Sn: 0 to 0.2000%,
Sb: 0 to 0.2000%,
Ca: 0 to 0.0050%,
Zn: 0 to 0.0050%,
La: 0 to 0.0050%,
Ce: 0 to 0.0050%,
O: 0 to 0.1000%,
V: 0 to 0.1000%,
W: 0 to 0.1000%,
Zr: 0 to 0.1000%,
Nb: 0 to 0.1000%,
Mg: 0 to 0.1000%,
Bi: 0 to 0.1000%,
Nd: 0 to 0.1000%,
Y: 0 to 0.1000%,
As: 0 to 0.1000%,
Ga: 0 to 0.1000%,
Ge: 0 to 0.1000%,
Co: 0 to 0.1000%,
Se: 0 to 0.1000%,
Pb: 0 to 0.1000%, and
the remainder: Fe and impurities is hot-rolled to obtain a hot-rolled steel sheet;
a winding process in which the hot-rolled steel sheet is wound and cooled;
a hot-band annealing process in which the cooled hot-rolled steel sheet is heated and cooled;
a cold rolling process in which the hot-rolled steel sheet after the hot-band annealing process is cold-rolled to obtain a cold-rolled steel sheet; and a final annealing process in which the cold-rolled steel sheet is finally annealed, wherein, in cooling of the hot-band annealing process of the hot-rolled steel sheet, a residence time in a temperature range of 500 to 200° C. is longer than a residence time in a temperature range of 700 to 500° C. and the residence time in a temperature range of 500 to 200° C. is 10 seconds or longer, and wherein, in the final annealing process, a maximum temperature is lower than 900° ° C., and an average cooling rate in a range of 700 to 500° C. is 20° C./sec or faster.

7. The method according to claim 5, wherein the chemical composition of the steel slab contains one or more of, in mass %, Ni: 0.01 to 0.50%,
Cu: 0.01 to 0.50%,
Sn: 0.01 to 0.2000%,
Sb: 0.01 to 0.2000%,
Ca: 0.0005 to 0.0050%,
Zn: 0.0003 to 0.0050%,
La: 0.0005 to 0.0050%,
Ce: 0.0005 to 0.0050%,
O: 0.0020 to 0.1000%,
V: 0.0010 to 0.0100%,
W: 0.0010 to 0.0100%,
Zr: 0.0010 to 0.0100%,
Nb: 0.0010 to 0.0100%,
Mg: 0.0010 to 0.0100%,
Bi: 0.0010 to 0.0100%,
Nd: 0.0010 to 0.0100%,
Y: 0.0010 to 0.0100%,
As: 0.0010 to 0.0100%,
Ga: 0.0010 to 0.0100%,
Ge: 0.0010 to 0.0100%,
Co: 0.0010 to 0.0100%,
Se: 0.0010 to 0.0100%, and
Pb: 0.0010 to 0.0100%.

8. The method according to claim 6, wherein the chemical composition of the steel slab contains one or more of, in mass %, Ni: 0.01 to 0.50%,
Cu: 0.01 to 0.50%,
Sn: 0.01 to 0.2000%,
Sb: 0.01 to 0.2000%,
Ca: 0.0005 to 0.0050%,
Zn: 0.0003 to 0.0050%,
La: 0.0005 to 0.0050%,
Ce: 0.0005 to 0.0050%,
O: 0.0020 to 0.1000%,
V: 0.0010 to 0.0100%,
W: 0.0010 to 0.0100%,
Zr: 0.0010 to 0.0100%,
Nb: 0.0010 to 0.0100%,
Mg: 0.0010 to 0.0100%,
Bi: 0.0010 to 0.0100%,
Nd: 0.0010 to 0.0100%,
Y: 0.0010 to 0.0100%,
As: 0.0010 to 0.0100%,
Ga: 0.0010 to 0.0100%,
Ge: 0.0010 to 0.0100%,
Co: 0.0010 to 0.0100%,
Se: 0.0010 to 0.0100%, and
Pb: 0.0010 to 0.0100%.

9. A production method for an electric motor according to claim 6, comprising:

a process in which a non-oriented electrical steel sheet is processed into a stator core shape to form a stator core material; and an annealing process in which the stator core material is heated to obtain a stator core, wherein, in the annealing process of the stator core material, a heating temperature is 750 to 850° C., and an average cooling rate in a range of 700 to 500° C. is 5° C./min or shorter;

wherein the non-oriented electrical steel sheet comprises a base material having a chemical composition including, in mass %, C: 0.0010 to 0.0040%,
Si: 3.2 to 4.5%,
sol. Al: 0.2 to 2.0%,
Mn: 0.1 to 3.5%,
P: more than 0% and 0.10% or less,
S: 0 to 0.0030%,
N: 0 to 0.0030%,
Ti: 0 to 0.0030%,
Mo: 0.0010 to 0.1000%,
Cr: 0 to 0.10%,
B: 0 to 0.0010%,
Ni: 0 to 0.50%,
Cu: 0 to 0.50%,
Sn: 0 to 0.2000%,
Sb: 0 to 0.2000%,
Ca: 0 to 0.0050%,
Zn: 0 to 0.0050%,
La: 0 to 0.0050%,
Ce: 0 to 0.0050%,
O: 0 to 0.1000%,
V: 0 to 0.1000%,
W: 0 to 0.1000%,
Zr: 0 to 0.1000%,
Nb: 0 to 0.1000%,
Mg: 0 to 0.1000%,
Bi: 0 to 0.1000%,
Nd: 0 to 0.1000%,
Y: 0 to 0.1000%,
As: 0 to 0.1000%,
Ga: 0 to 0.1000%,
Ge: 0 to 0.1000%,
Co: 0 to 0.1000%,
Se: 0 to 0.1000%,
Pb: 0 to 0.1000%, and
the remainder: Fe and impurities, wherein the non-oriented electrical steel sheet has a tensile strength of 550 MPa or more, and a ratio $(P_{120B}/Fe_{700B})_B$ between a peak-to-peak height $Fe_{700B}$ of Fe at 700 eV and a peak-to-peak height $P_{120B}$ of P at 120 eV when crystal grain boundaries are measured through Auger electron spectroscopy is not more than twice a ratio $(P_{120i}/Fe_{700i})_i$ between a peak-to-peak height $Fe_{700i}$ of Fe at 700 eV and a peak-to-peak height $P_{120i}$ of P at 120 eV when the inside of crystals is measured through Auger electron spectroscopy.

10. The production method according to claim 9, wherein the chemical composition of the non-oriented electrical steel sheet contains one or more of, in mass %, Ni: 0.01 to 0.50%,
Cu: 0.01 to 0.50%,
Sn: 0.01 to 0.2000%,
Sb: 0.01 to 0.2000%,
Ca: 0.0005 to 0.0050%,
Zn: 0.0003 to 0.0050%, La: 0.0005 to 0.0050%,
Ce: 0.0005 to 0.0050%,
O: 0.0020 to 0.1000%,
V: 0.0010 to 0.0100%,
W: 0.0010 to 0.0100%,
Zr: 0.0010 to 0.0100%,
Nb: 0.0010 to 0.0100%,
Mg: 0.0010 to 0.0100%,
Bi: 0.0010 to 0.0100%,
Nd: 0.0010 to 0.0100%,
Y: 0.0010 to 0.0100%,
As: 0.0010 to 0.0100%,
Ga: 0.0010 to 0.0100%,
Ge: 0.0010 to 0.0100%,
Co: 0.0010 to 0.0100%,
Se: 0.0010 to 0.0100%, and
Pb: 0.0010 to 0.0100%.

* * * * *